United States Patent [19]
Nagata et al.

[11] Patent Number: 5,436,780
[45] Date of Patent: Jul. 25, 1995

[54] THIN FILM MAGNETIC HEAD DEVICE

[75] Inventors: Yuji Nagata, Yao; Toshio Fukazawa, Kyoto; Kumiko Wada, Kawanishi; Yoshihiro Tozaki, Ibaraki; Satoru Mitani, Hirakata; Terumi Yanagi, Osaka, all of Japan

[73] Assignee: Matsushita Electric Industrial Co., Ltd., Osaka, Japan

[21] Appl. No.: 897,448

[22] Filed: Jun. 10, 1992

[51] Int. Cl.⁶ .............................. G11B 5/265
[52] U.S. Cl. ..................... 360/121; 360/122
[58] Field of Search ............ 360/104, 129, 121, 122

[56]  References Cited

U.S. PATENT DOCUMENTS

| | | | |
|---|---|---|---|
| 3,047,674 | 7/1962 | Keskinen | 360/129 |
| 3,274,347 | 9/1966 | Page | 360/104 |
| 3,412,216 | 11/1968 | Rosado et al. | 360/129 |
| 3,969,770 | 7/1976 | Cavallari | 360/129 |
| 4,685,005 | 8/1987 | Fields, Jr. | 360/121 |
| 5,027,245 | 6/1991 | Nagata et al. | |
| 5,068,760 | 11/1991 | Kira | 360/104 |
| 5,153,980 | 10/1992 | Kira | 360/121 |

FOREIGN PATENT DOCUMENTS

| | | |
|---|---|---|
| 0131727 | 5/1984 | European Pat. Off. |
| 0348769 | 6/1989 | European Pat. Off. |
| 64-57413 | 3/1989 | Japan |
| 2-166607 | 6/1990 | Japan |
| 6705846 | 5/1968 | Netherlands |
| 1339091 | 7/1972 | United Kingdom |
| 1059611 | 12/1983 | U.S.S.R. ............ 360/129 |

OTHER PUBLICATIONS

IBM Technical Bulletin vol. 28 #2 Jul. 1985.

*Primary Examiner*—Thomas E. Denion
*Attorney, Agent, or Firm*—Wenderoth, Lind & Ponack

[57]  ABSTRACT

A thin film magnetic head device to be equipped on a magnetic recording and reproducing system can meet a plurality of recording formats and carry out stabilized recording/reproducing without depending on the running direction of the magnetic tape. There are combined either of at least two thin film magnetic heads for recording each having on a substrate a recording transducer for recording information on a magnetic tape or two thin film magnetic heads for reproducing each having a reproducing transducer for reading out information recorded on a magnetic tape or two thin magnetic heads for recording and reproducing .in which the recording transducer and the reproducing transducer exist together. According to the running direction of the magnetic tape, only the thin film magnetic head Which is situated at the downstream side in the running direction of the magnetic tape is activated to be always in an operating condition.

6 Claims, 4 Drawing Sheets

THIN FILM MAGNETIC HEAD DEVICE

BACKGROUND OF THE INVENTION:

1. Field of the Invention

The present invention relates to a thin film magnetic head device to be used with a magnetic recording and reproducing system, more particularly, to a thin film magnetic head device to be used with a magnetic recording and reproducing system which conforms to a plurality of recording formats having different in numbers of channels and track widths, in which the magnetic tape as a recording medium runs forward and backward, and the relative positions between the magnetic tape and the magnetic head are substantially fixed.

2. Description of Prior Art

FIG. 4 is a view of a conventional thin film magnetic head to be used with a magnetic recording and reproducing system in which the magnetic tape runs forward and backward and which conforms to a plurality of recording formats having different numbers of channels and track widths. FIG. 4 shows the case of a combination type thin film magnetic head 36 made by combining two thin film magnetic heads conforming to the recording format of one-side having 4 channels and one-side having 2 channels.

On a substrate 20 there are formed the reproducing transducers 21a, 21b, 21c and 21d which are constituted by the thin films for four channels, and the reproducing transducers 22a and 22b which are similarly constituted by the thin films for two channels, and on a substrate 30 there are formed the recording transducers 31a, 31b, 31c and 31d which are constituted by the thin films for four channels, and the recording transducers 32a and 32b which are similarly constituted by the thin films for two channels.

As a reproducing transducer, there is formed a magneto-resistive type transducer made by applying the well known magneto-resistive effect of a magnetic thin film or a coil type constituted by winding a thin film coil around a thin film magnetic core. As a recording transducer, there is formed the well known inductive type transducer similarly made by winding a thin film coil around a thin film magnetic core. The track width Tr of the recording transducer is formed to agree with the track width of the corresponding format.

On the substrates 20 and 30 there are constituted a thin film magnetic head for reproducing 25 and a thin film magnetic head for recording 35 with the cover plates 23 and 33 being bonded thereto, respectively. With respect to the thin film magnetic head for reproducing 25 and the thin film magnetic head for recording 35, the substrates are mutually bonded and a combination type thin film magnetic head 36 is constituted.

Other methods of combining the thin film magnetic heads include a method of bonding the cover plates together, a method of bonding the substrate and the cover plate, and the like. The parts 24 and 34 are the thin film layers on which the aforementioned reproducing transducer and recording transducer are formed.

Next, the operation of the conventional thin film magnetic head will be described. First, when the running direction of the magnetic tape is in a normal direction A and the recording format is of four channels, recording is carried out by using the recording transducers 31a, 31b, 31c and 31d of the thin film magnetic head for recording 35, and reproduction is carried out by using the reproducing transducers 21a, 21b, 21c and 21d of the thin film magnetic head for reproducing 25. In case the running direction of the magnetic tape is B and the recording format is of two channels, recording is carried out by using the recording transducers 32a and 32b, and reproduction is carried out by using the reproducing transducers 22a and 22b.

However, in general the tension of the magnetic tape during the tape running is larger in the magnetic head situated on the downstream side of the running direction of the magnetic tape than in the magnetic head situated on the upstream side thereof. Accordingly, the magnetic tape runs in sliding movement in closer contact with the magnetic head on the downstream side. For this reason, it is possible for the magnetic head situated on the downstream side to carry out recording and reproducing in stabilized state in comparison with the magnetic head situated on the upstream side.

However, in the conventional combination type thin film magnetic head, there may be cases where the thin film magnetic head situated on the upstream side is operated in coordination with the running direction of the magnetic tape or recording format or operation mode as to the recording state or reproducing state, etc. In such a case, the sliding condition between the magnetic tape and the thin film magnetic head is aggravated to provide a problem of the impossibility to carrying out stabilized recording and reproducing.

SUMMARY OF THE INVENTION

In reflection of the defects of the conventional combination type thin film magnetic head, an object of the present invention is to provide easily and at low cost a thin film magnetic head device which can be equipped on a magnetic recording and reproducing system which can conform to a plurality of recording formats and carry out stabilized recording and reproducing without depending on the running direction of the magnetic tape.

In order to attain the above object, a thin film magnetic head device of the present invention comprises a combination type magnetic head formed by combining at least two thin film magnetic heads for recording each having on a substrate a recording transducer for recording information on a magnetic tape or at least two thin film magnetic heads for reproducing each having a reproducing transducer for reading out information recorded on a magnetic tape or at least two thin magnetic heads for recording and reproducing in which a recording transducer and a reproducing transducer exist in mixture, and a means for activating a thin film magnetic head which is situated at the downstream side in a running direction of said magnetic tape to be in an operating condition of recording information on the magnetic tape or reading out the information recorded on the magnetic tape according to the running direction of the magnetic tape.

By the constitution as above, in the thin film magnetic head device of the present invention, without being dependent on the corresponding recording format, running direction of the magnetic tape, and operation mode such as recording or reproducing, the thin film magnetic head on the downstream side at all times assumes the recording operation state or reproducing operation state, thereby making it possible to carry out stabilized recording and reproducing.

BRIEF DESCRIPTION OF THE DRAWINGS

FIG. 1 (b) is a view of a thin film magnetic head for recording and reproducing to be used on the thin film magnetic head device of the first embodiment of the present invention;

FIG. 2 (b) is a view of a thin film magnetic head for exclusive reproducing to be used on the thin film magnetic head device of the second embodiment of the present invention;

FIG. 3 (b) is a view of a thin film magnetic head for exclusive recording to be used on the thin film magnetic head device of the third embodiment of the present invention.

DESCRIPTION OF PREFERRED EMBODIMENTS

An embodiment of the present invention is described below.

Figure 1A:
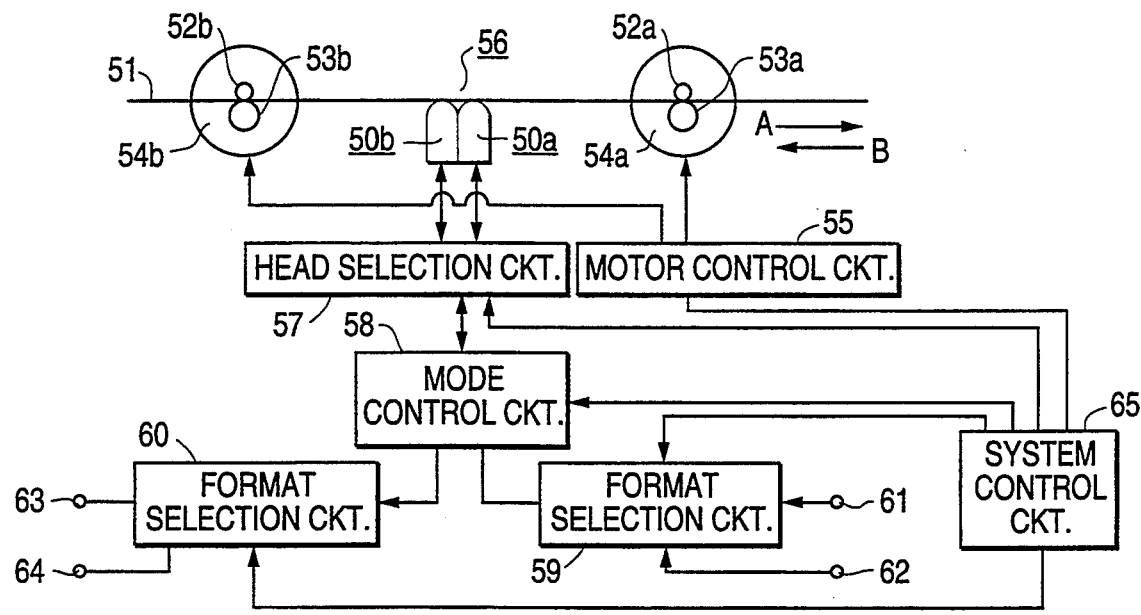
FIG. 1 (a) is a block diagram of a thin film magnetic head device showing the first embodiment of the present invention.
Figure 1B:
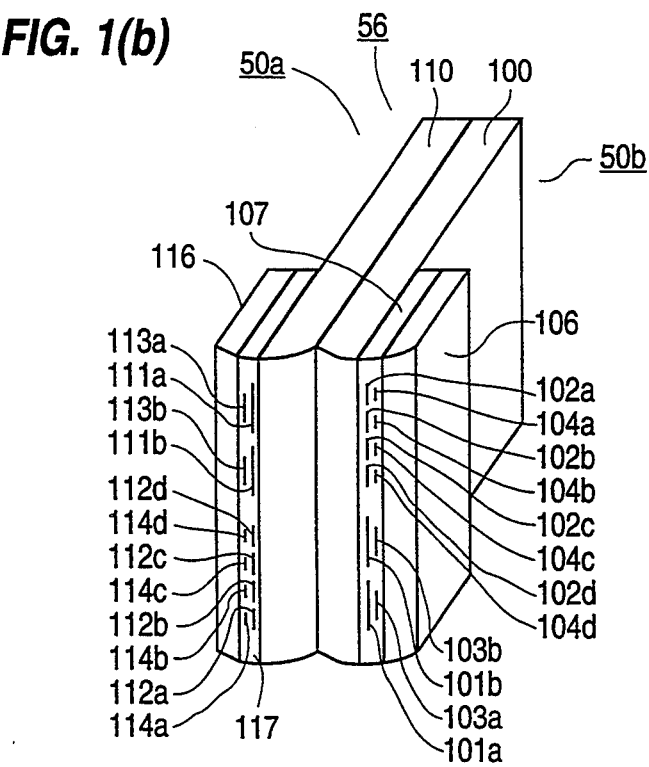

FIG. 1 (a) shows a block diagram of a thin film magnetic head device in a preferred embodiment of the present invention, and FIG. 1 (b) is a view of a combination type thin film magnetic head to be used at such time.

In this embodiment, the recording format shows the cases of one side having 4 channels and 2 channels, in the same manner as in the conventional case. Namely, the magnetic tape 51 runs under the state of being held between the capstan 52a and the pinch roller 53a, or between the capstan 52b and the pinch roller 53b. The capstans 52a and 52b are driven by the capstan motors 54a and 54b, respectively. By controlling the capstans 54a and 54b with the motor control circuit 55, the running direction, running speed, etc. of the magnetic tape can be controlled. During the operation, the above magnetic tape 51 is in contact with the combination type thin film magnetic head 56.

The combination type thin film magnetic head 56 to be used in this embodiment is formed by combining the two thin film magnetic heads 50a and 50b which are fabricated in entirely the same manner as shown in FIG. 1 (b) so that the substrates 100 and 110 are disposed oppositely to each other. For the respective thin film magnetic head 50b (50a) there are formed on the substrate 100 (110) the recording transducers for two channels 101a, 101b (111a, 111b) and the recording transducers for four channels 102a, 102b, 102c, 102d (112a, 112b, 112c, 112d), and on the upper part thereof the reproducing transducers for two channels 103a, 103b (113a, 113b) and the reproducing transducers for four channels 104a, 104b, 104c, 104d (114a, 114b, 114c, 114d), with alignment of positions.

As the reproducing transducer, there is formed the already well known magneto-resistive type transducer made by applying the magneto-resistive effect of the magnetic thin film or the coil type transducer constituted by winding a thin film coil around the thin film magnetic core. As the recording transducer, there is formed likewise the well known inductive type transducer made by winding a thin film coil around the thin film magnetic core.

The track width of the recording transducer is formed to meet the corresponding recording format. That is to say, in this embodiment, the recording transducers for two channels 101a, 101b (111a, 111b) and the recording transducers for four channels 102a, 102b, 102c, 102d (112a, 112b, 112c, 112d) have the different track widths. Further, the numerals 107 and 117 denote the thin film layers on which the recording transducer and the reproducing transducer are formed.

As shown in FIG. 1 (a), the combination type thin film magnetic head 56 is sequentially connected to a head selection circuit 57, mode selection circuit 58, format selection circuit in recording 59, and format selection circuit in reproducing 60. To the format selection circuit in recording 59 a recording signal for two channels is inputted from the connection terminal 61, and a recording signal for four channels from the connection terminal 62. To the format selection circuit in reproducing 60 a reproducing signal for two channels is outputted from the connection terminal 63, and a reproducing signal for four channels from the connection terminal 64. The capstan motors 54a and 54b are connected to the motor control circuit 55. And, these members are connected and controlled by a system control circuit 65.

Hereinafter, the operation of this embodiment is described. For example, when the recording format is of two channels and the mode is in recording condition, the system control circuit 65 supplies the signal to determine the recording format to the recording format selection circuit 59 to select the recording signal for two channels and supplies the selected recording signal to the mode selection circuit 58. When the recording format is of four channels, similarly the recording signal for four channels is selected, which is supplied to the mode selection circuit. The mode selection circuit 58 supplies the recording signal for 2 channels or the recording signal for 4 channels to the head selection circuit under supply of the signal showing that the system is in recording condition from the system control circuit 65. Further, a signal to control the running direction of the magnetic tape is supplied from the system control circuit 65 to the motor control circuit 55, and a signal pursuant thereto to determine the thin film magnetic head which should be put to an operating condition out of the two thin film magnetic heads 50a and 50b which constitute the combination type thin film magnetic head 56 is supplied to the head selection circuit 57. For example, when the magnetic tape running direction is A, the motor control circuit 55 causes to rotate the capstan motor 54a, and at the same time the head selection circuit 57 supplies the recording signals for two channels to the recording transducers for two channels 111a and 111b, or the recording signals for four channels to the recording transducers for four channels 112a, 112b, 112c and 112d, so that the thin film magnetic head 50a positioned downstream the running direction of the magnetic tape is in recording state. Similarly, when the magnetic tape running direction is B, the motor control circuit 55 causes to rotate the capstan motor 54b, and at the same time the head selection circuit 57 supplies the recording signals for two channels to the recording transducers for two Channels 101a and 101b, or the recording signals for four channels to the recording transducers for four channels 102a, 102b, 102c and 102d, so that the thin film magnetic head 50b positioned downstream the running direction of the magnetic tape is in recording state. In this way, information is recorded on the magnetic tape 51.

Similarly, in case of the reproduction, firstly when the magnetic tape running direction is A, the motor control circuit 55 causes to rotate the capstan motor 54a, and at the same time the head selection circuit 57 causes to make the thin film magnetic head 50a positioned downstream the magnetic tape running direction reproducing state. In other words, the reproducing transducers for two channels 113a and 113b, or the reproducing transducers for four channels 114a, 114b, 114c and 114d reproduce the information on the magnetic tape and supply the reproduced signals to the mode selection circuit 58. Similarly, when the magnetic tape running direction is B, the motor control circuit 55 causes to rotate the capstan motor 54b, and at the same time the head selection circuit 57 causes to make the thin film magnetic head 50b positioned downstream the magnetic tape running direction reproducing state. The reproducing transducers for two channels 103a and 103b, or the reproducing transducers for four channels 104a, 104b, 104c and 104d reproduce the information on the magnetic tape and supply the reproduced signals to the mode selection circuit 57. When the system is in reproducing state, the mode selection circuit 58 supplies the above reproduced signals to the format selection circuit in reproducing 60 by the signal from the system control circuit 65. Finally, in the format selection circuit in reproducing 60 the signal to be outputted is determined by the signal from the system control circuit 65, and the reproducing signals for two channels are outputted from the connection terminal 63 and the reproducing signals for four channels from the connection terminal 64, to the external circuit.

Figure 2A:
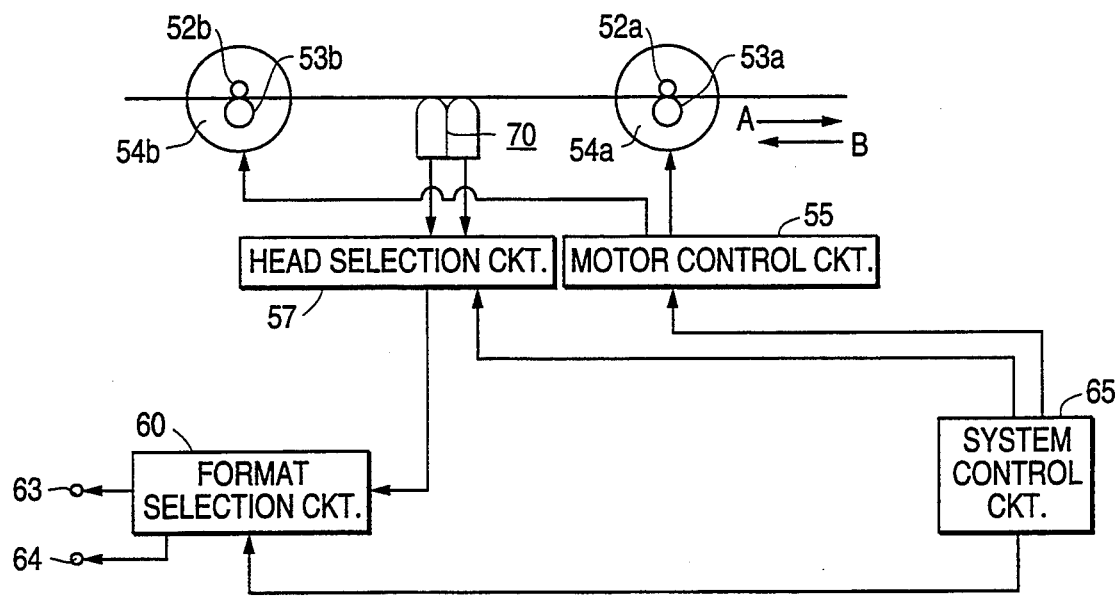
FIG. 2 (a) is a block diagram of a thin film magnetic head device showing the second embodiment of the present invention.
Figure 2B:
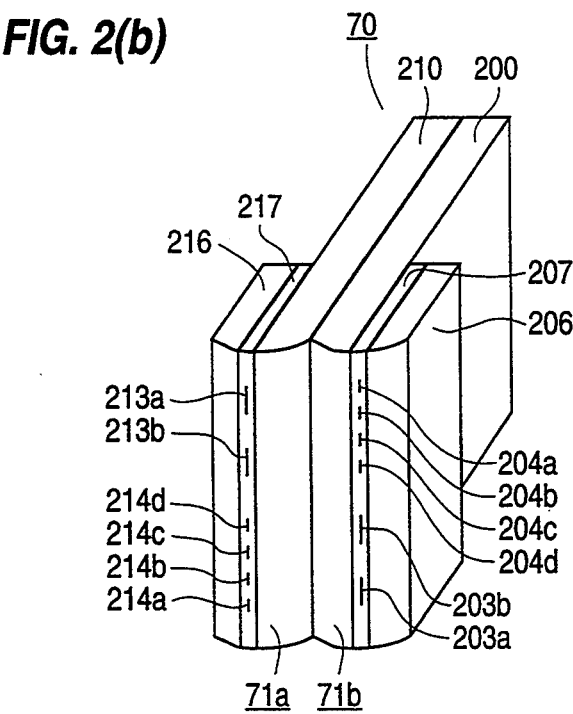

FIG. 2 (a) shows the second embodiment of the thin film magnetic head device in the present invention. This embodiment shows a thin film magnetic head device to be used exclusively for reproducing, and is not equipped with the format selection circuit and mode selection circuit for recording as in the first embodiment. The combination type thin film magnetic head for reproduction only 70 which is used in this embodiment is one made by combining the two thin film magnetic heads for reproduction only, 71a and 71b, which are made in entirely the same as shown in FIG. 2 (b), in a manner for the substrates 200 and 210 to be opposite to each other. The respective thin film magnetic heads 71a (71b) are made by forming on the substrates 210 (200) the reproducing transducers for two channels 213a, 213b (203a, 203b) and the reproducing transducers for four channels 214a, 214b, 214c, 214d (204a, 204b, 204c, 204d).

As the reproducing transducer, there is formed a magneto-resistive type transducer made by applying the well known magneto-resistive effect of magnetic thin film or a coil type transducer constituted by winding a thin film coil around a thin film magnetic core.

The operation of this embodiment is the reproducing operation only in the first embodiment, and is entirely same as that at that .time.

Figure 3A:
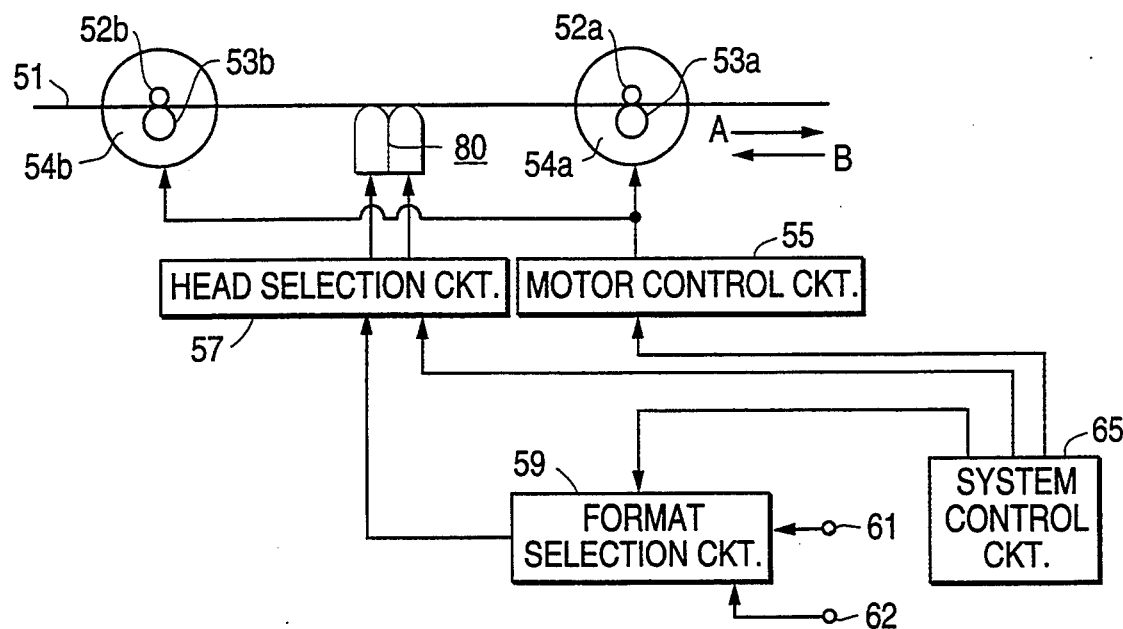
FIG. 3 (a) is a block diagram of a thin film magnetic head device showing the third embodiment of the present invention.
Figure 3B:
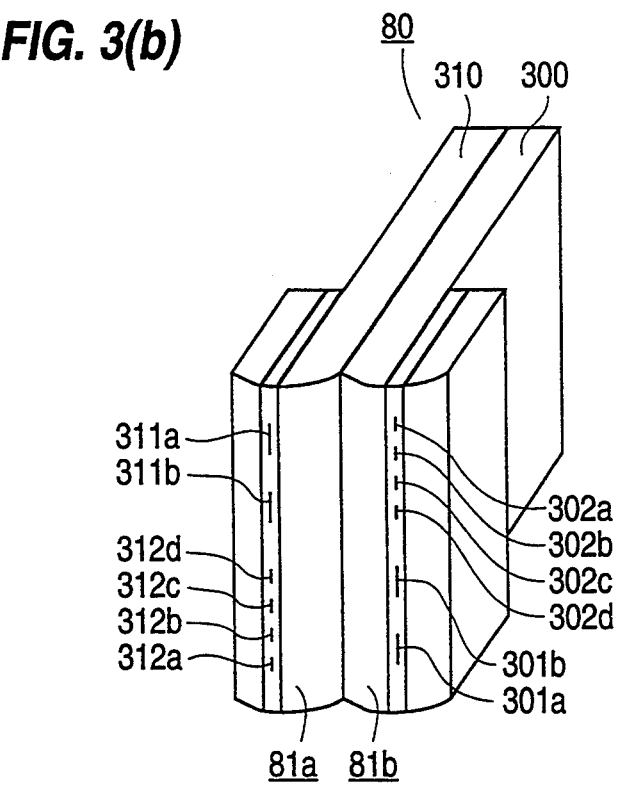
Figure 4:
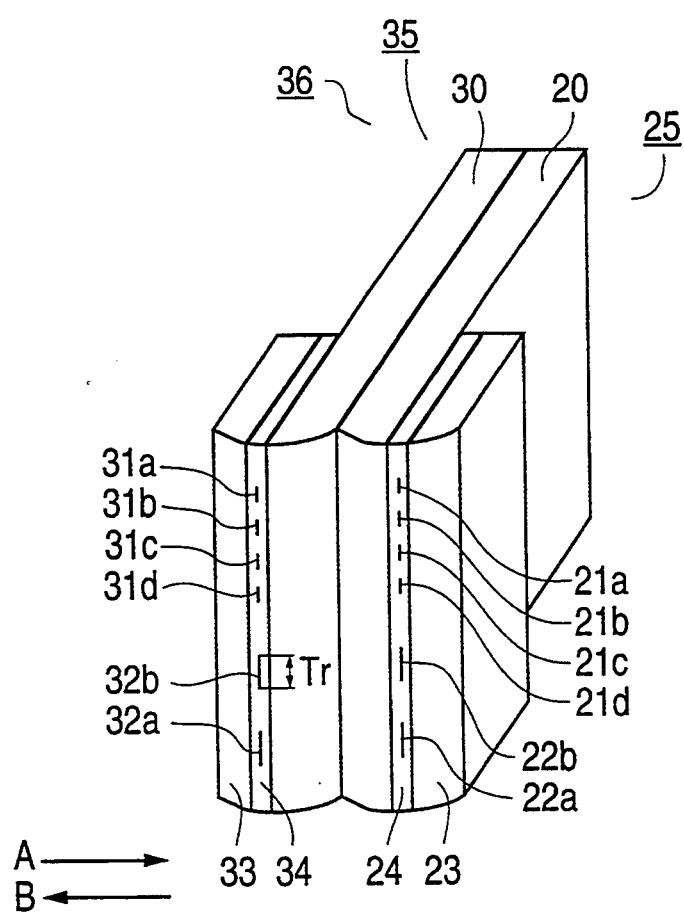
FIG. 4 is a view of a conventional thin film magnetic head.

FIG. 3 (a) shows the third embodiment of the thin film magnetic head device in the present invention. This embodiment shows a thin film magnetic head device to be used exclusively for recording, and is not equipped with the format selection circuit and mode selection circuit for reproducing as in the first embodiment.

The combination type thin film magnetic head for recording only 80 which is used in this embodiment is one made by combining the two thin film magnetic heads for recording only, 81a and 81b, which are made in entirely the same as shown in FIG. 3 (b), in a manner for the substrates 310 and 300 to be opposite to each other. The respective thin film magnetic .heads 81a (81b) are made by forming on the substrates 310 (300) the recording transducers for two channels 311a, 311b (301a, 301b) and the reproducing transducers for four channels 312a, 312b, 312c, 312d (302a, 302b, 302c, 302d).

As a recording transducer, there is formed an inductive type transducer similarly made by winding a thin film coil around the thin film magnetic core. Elements 217 and 207 are show the thin film layers on which the recording transducers are formed.

The operation of this embodiment is the recording operation only in the first embodiment, and is entirely same as that at that time.

As described above, in the thin film magnetic head device of the present invention, without being dependent on the corresponding recording format, running direction of the magnetic tape, and operation mode such as recording or reproducing, the thin film magnetic head on the downstream side at all times assumes the operation state, thereby making it possible to carry out stabilized recording and reproducing.

What is claimed is:

1. A thin film magnetic head device comprising:
   a combination type magnetic head for recording information on a magnetic tape and formed by at least two thin film magnetic heads which are fixed to each other so as to be apart from each other in a running direction of said magnetic tape, and
   a means for activating only one of the two thin magnetic heads which is situated at a downstream side with respect to the running direction of the magnetic tape to record the information on the magnetic tape according to the running direction of the magnetic tape.

2. The thin film magnetic head device of claim 1, wherein said combination type magnetic head comprises a combination of two thin film magnetic heads having different plural track widths and different plural channel numbers so as to meet plural recording formats.

3. The thin film magnetic head device of claim 1, wherein each of said thin film magnetic heads comprises a substrate, and a recording or reproducing transducer formed on the substrate.

4. A thin film magnetic head device comprising:
   a combination type magnetic head for recording information on a magnetic tape and reproducing information from the magnetic tape, said head formed by at least two thin film magnetic heads which are fixed to each other so as to be apart from each other in a running direction of said magnetic tape, and
   a means for activating only one of the two thin magnetic heads which is situated at a downstream side with respect to the running direction of the magnetic tape to record the information on the magnetic tape according to the running direction of the magnetic tape.

5. The thin film magnetic head device of claim 4, wherein said combination type magnetic head comprises a combination of two thin film magnetic head comprises a combination of two thin film magnetic heads having different plural track widths and different plural channel numbers so as to meet plural recording formats.

6. The thin film magnetic head device of claim 4, wherein each of said thin film magnetic heads comprises a substrate, and recording and reproducing transducers formed on the substrate.

* * * * *